United States Patent [19]

LaRochelle

[11] Patent Number: 5,791,377
[45] Date of Patent: Aug. 11, 1998

[54] ELECTRICALLY HEATED CONDUIT

[75] Inventor: Christopher John LaRochelle, Westland, Mich.

[73] Assignee: Yazaki Corporation, Tokyo, Japan

[21] Appl. No.: 679,373

[22] Filed: Jul. 8, 1996

[51] Int. Cl.$^6$ ............................................. E03B 7/10
[52] U.S. Cl. .................. 138/33; 138/109; 138/127; 439/193; 15/250.01; 15/250.04; 15/250.05
[58] Field of Search .................. 138/33, 32, 104, 138/109, 127; 15/250.01, 250.03, 250.04, 250.05; 439/191, 192, 193, 194; 285/7, 149.1, 907

[56] References Cited

U.S. PATENT DOCUMENTS

| | | | |
|---|---|---|---|
| 2,915,615 | 12/1959 | Leipold et al. | 138/33 |
| 3,314,039 | 4/1967 | Opper | 439/191 |
| 3,791,415 | 2/1974 | Lawless et al. | 138/32 |
| 3,928,715 | 12/1975 | Holden | 138/103 |
| 4,038,519 | 7/1977 | Foucras | 138/33 |
| 4,447,707 | 5/1984 | Baker | 138/33 |
| 4,644,134 | 2/1987 | Baker | 138/33 |
| 4,675,780 | 6/1987 | Barnes et al. | 138/109 |
| 4,682,010 | 7/1987 | Drapeau et al. | 138/128 |
| 4,815,769 | 3/1989 | Hopperdietzel | 138/33 |
| 4,920,602 | 5/1990 | Kuehbauch | 15/250.04 |
| 5,354,965 | 10/1994 | Lee | 15/250.05 |
| 5,387,117 | 2/1995 | Moyher, Jr. et al. | 439/191 |

FOREIGN PATENT DOCUMENTS

| | | | |
|---|---|---|---|
| 2641221 | 3/1978 | Germany | 15/250.05 |
| 4118926 | 12/1992 | Germany | 15/250.05 |

Primary Examiner—David Scherbel
Assistant Examiner—James F. Hook
Attorney, Agent, or Firm—Young & Basile, P.C.

[57] ABSTRACT

A conduit is electrically heatable to prevent the freezing of a fluid flowing therethrough. The conduit comprises a tube having wires embedded in its walls and end fittings attached to either end of the tube which provide for fluid flow connection with the conduit and for electrical connection with the wires.

12 Claims, 2 Drawing Sheets

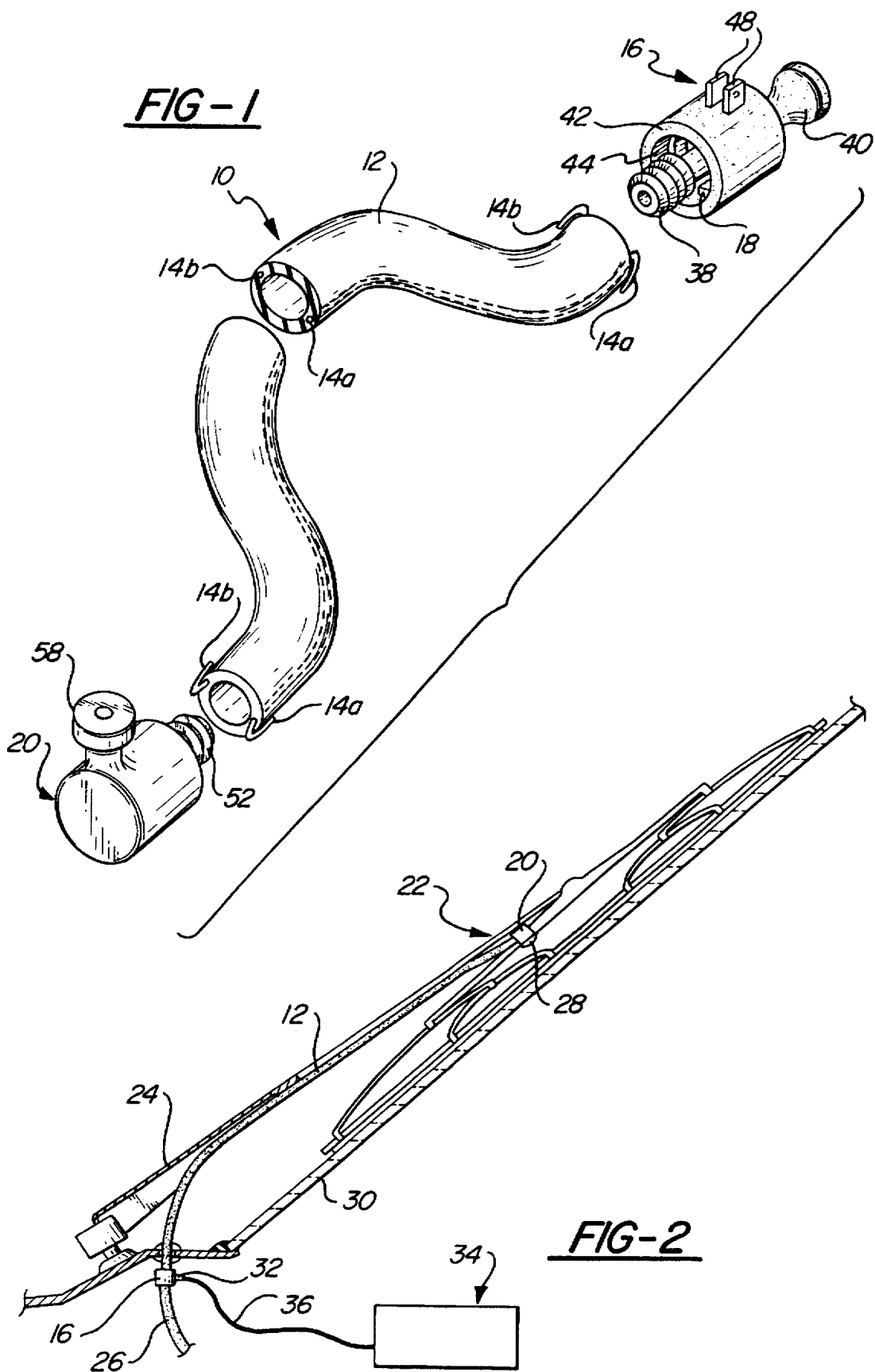

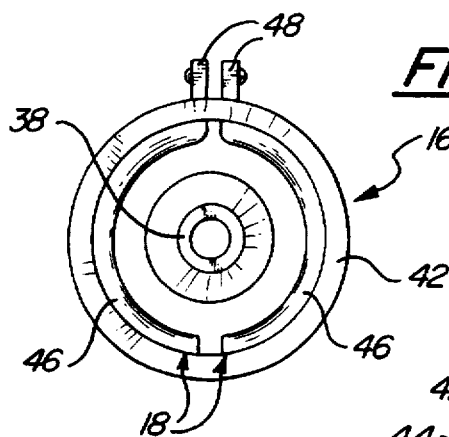
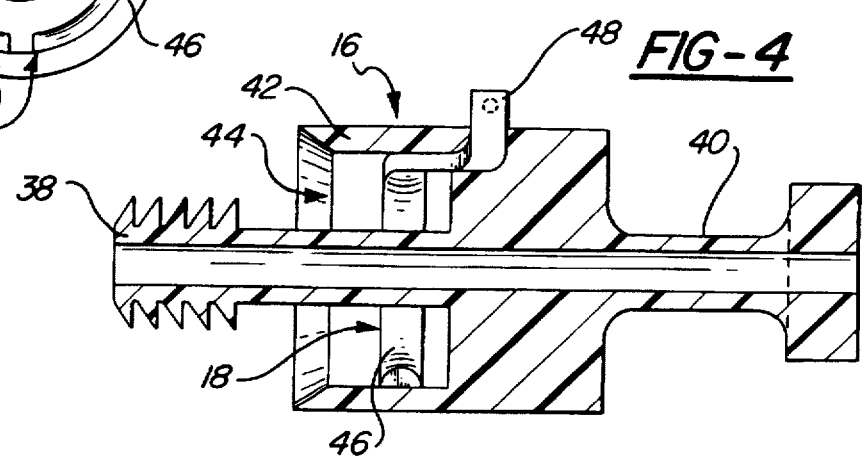
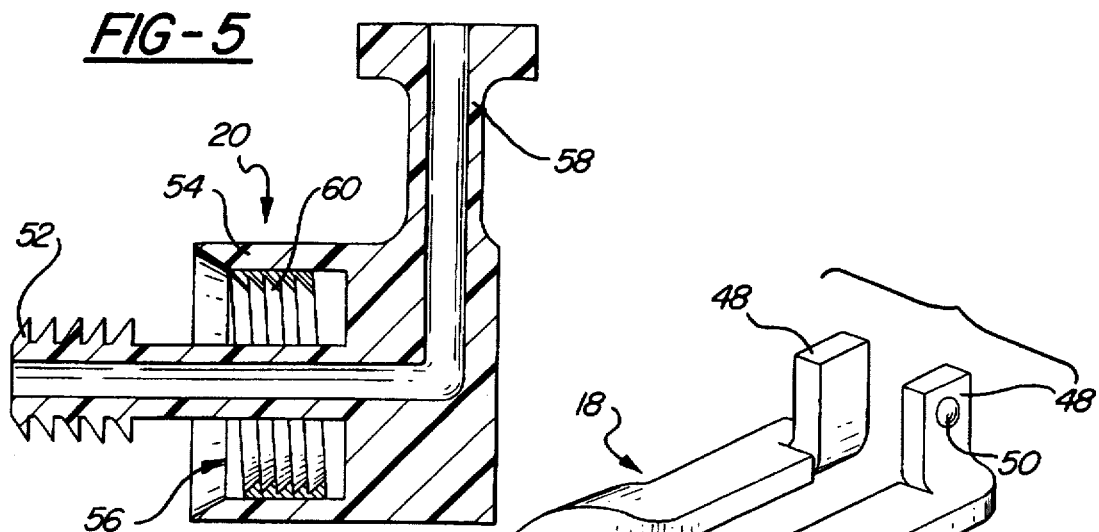
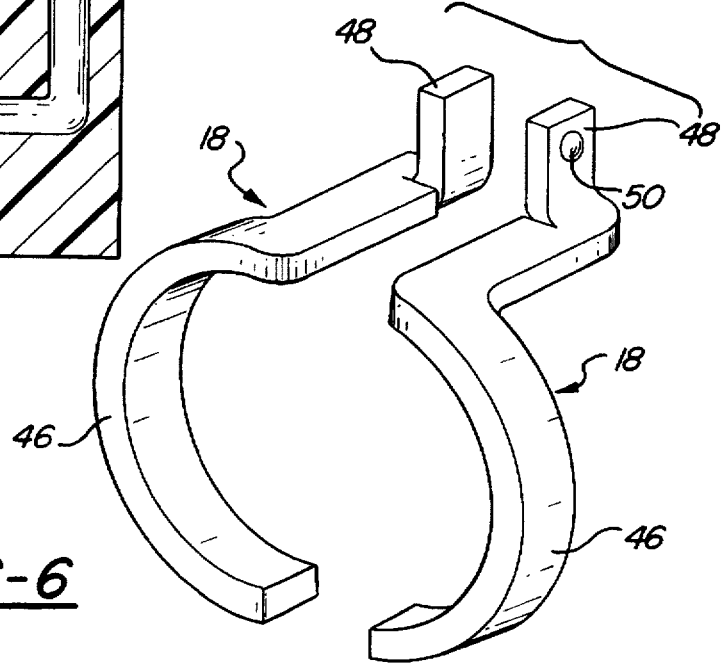

ELECTRICALLY HEATED CONDUIT

FIELD OF THE INVENTION

This invention relates to conduits for conveying fluids and more specifically to such a conduit which is heated in order to prevent freezing of a fluid flowing therethrough.

BACKGROUND OF THE INVENTION

There are many situations in which it is desirable to heat a pipe, tube, or conduit in order to prevent a fluid flowing through the conduit from freezing or otherwise becoming too cold for its desired purpose. Plumbing pipes in poorly insulated buildings, for example, may be prone to freezing during cold weather. It is well known to prevent freezing of a pipe by wrapping electrically conductive wires around it and applying an electric current to the wires, the resistance heating of the wires serving to warm the pipe sufficiently to prevent freezing of the water therein.

In automotive vehicles, the lines that carry windshield washer fluid from a washer fluid reservoir to a spray nozzle may be prone to freezing if the fluid does not contain a high enough concentration of an anti-freezing agent such as propylene glycol. U.S. Pat. No. 4,090,668 and No. 4,575,003 both disclose systems using residual heat from a vehicle's engine cooling system to heat windshield washer fluid before the fluid is conducted out of the engine compartment to the spray nozzles, and having electric resistance heating coils to heat the fluid when the engine is not running or is otherwise not producing enough heat to warm the fluid sufficiently. Both of these systems require the addition of a substantial amount of mechanical and electrical apparatus to the vehicle, thus adding to the cost and complexity of the vehicle.

SUMMARY OF THE INVENTION

It is an object of the present invention to provide a conduit of simple, inexpensive construction for heating a fluid contained in and/or flowing through the conduit.

It is a further object of the invention to provide an electrically heated conduit having end fittings which provide for electrical connection to an electric circuit as well as for fluid flow connection to related fluid handling components.

It is a still further object of the invention to provide an electrically heated conduit which is operable when only one of its ends is connected to an electric circuit.

According to the invention, the conduit comprises a tube having a pair of electrically conductive wires extending along its length, a power supply end fitting adapted to be urged into connection with a first end of the tube and having a pair of terminals for making electrical contact with the respective wires and connecting the wires to the electric circuit, and a shorting end fitting adapted to be urged into connection with an opposite second end of the tube and having electrically conductive shorting means for connecting the wires to one another. This configuration provides a heated conduit that is economically manufactured and assembled, and which may be supplied with electric current by means of only a single electric connection made at the power supply end fitting.

In the preferred embodiment of the invention described herein, each of the end fittings comprises a hollow stem which is inserted into the fluid passage of the tube to provide a continuation of the fluid flow path, and a shroud surrounding the stem and defining an annular receptacle therearound which fits over the outer surface of the tube when the fitting is urged into connection with the tube. The terminals are positioned inside of the receptacle in the power supply end fitting and are semi-circular, each terminal wrapping around approximately half of the circumference of the receptacle and having a tab which extends through the end fitting for connecting the terminal to the circuit. The shorting end fitting receptacle contains an annular shorting ring which extends completely around the circumference of the receptacle.

The wires are embedded within the tube along almost its entire length, but are exposed on the outer surface of the tube adjacent the first and the second ends of the tube so as to make electrical contact with the terminals and the shorting ring respectively when the end fittings are attached to the tube. Each wire contacts a respective terminal in the power supply end fitting, and the shorting ring connects the two wires with one another at the second end of the tube thus completing the electric circuit so that current can flow through both wires. The wires at the first end of the tube are exposed at diametrically opposite positions on the tube outer surface, so that each wire contacts a different terminal regardless of the angular position of the tube relative to the power supply end fitting when the tube is inserted into the receptacle.

BRIEF DESCRIPTION OF THE DRAWINGS

FIG. 1 is an exploded perspective view of the invention conduit;

FIG. 2 is a view of the conduit of FIG. 1 installed as part of an automobile windshield wiper assembly;

FIG. 3 is an end view of a power connection end fitting according to the invention;

FIG. 4 is a cross-sectional view of the power connection end fitting;

FIG. 5 is a cross-sectional view of a shorting end fitting; and

FIG. 6 is a perspective view of the terminals used in the power connection end fitting.

DETAILED DESCRIPTION OF THE PREFERRED EMBODIMENT

As seen in FIG. 1, a conduit 10 according to the present invention comprises a tube 12 having a pair of electrically conductive wires 14a, 14b embedded therein and protruding out of the tube at either end, a push on power connection end fitting 16 which attaches to a first end of the tube and has a pair of terminals 18 projecting therefrom, and a push on shorting end fitting 20 which attaches to a second end of the tube. In the depicted embodiment of the invention, conduit 10 is adapted for use as part of an automotive vehicle windshield wiper assembly 22 as seen in FIG. 2. Conduit 10 is mounted to a wiper arm 24 and carries washing fluid from a mating tube component 26 inside of the vehicle to a spray nozzle 28 located on the wiper for delivery of washing fluid onto a windshield 30. An electrical connector 32 snaps into attachment with terminals 18 of power supply end fitting 16 and is connected to the vehicle electrical system, indicated schematically at 34, by a cable 36. When current is applied to conduit 10, the resulting resistance heating of wires 14a, 14b warms tube 12 to prevent freezing of the fluid contained therein during low temperature conditions.

Tube 12 is formed of a dielectric material, preferably a rubber or plastic compound which maintains good flexibility and strength regardless of temperature changes. Wires 14a, 14b are embedded in and completely surrounded by the wall of tube 12, extending along the full length of the tube and protruding therefrom at either end. Wires 14a, 14b may extend straight between the two ends of tube 12 as indicated in FIG. 1 or may follow a non-linear path, such as a spiral or serpentine, along the tube to increase the length of wire per unit length of the tube and thereby provide a greater heating effect when the wires are energized.

Referring to FIGS. 3 and 4, power connection end fitting 16 is generally cylindrical and is formed of a dielectric material such as plastic. Fitting 16 comprises a stem 38 extending from one end, a coupling 40 extending from an opposite end, and a shroud 42 which surrounds the base of the stem and defines an annular receptacle 44 therearound. Stem 38 and coupling 40 are both hollow and define a continuous fluid passageway through fitting 16. Stem 38 is of small enough outside diameter to be inserted into the inner passage of tube 12, and has a series of circumferential ridges formed adjacent its tip which serve to hold fitting 16 in secure engagement with the tube when so inserted. Coupling 40 may be of any configuration and extend from end fitting 16 in any direction necessary to facilitate connection between the end fitting and a mating fluid handling component such as another tube, a fluid reservoir, a spray nozzle, etc.

First and second electrically conductive terminals 18 are preferably molded integrally with power end fitting 16, as by an insert molding process. Each terminal comprises a C-shaped contact 46 positioned inside of receptacle 44 and a tab 48 which extends from one end of the contact and projects completely through the fitting to be exposed on the exterior thereof. Contacts 46 extend around the inner surface of receptacle 44, lining the inner circumference of the receptacle except for small gaps between the terminals at their ends. The gaps are sufficiently wide to electrically isolate terminals 18 from one another. Tabs 48 extend outwardly from fitting 16 adjacent to one another and generally in parallel. A detent bump 50 is located on the outward facing surface of each tab 48.

Referring to FIG. 5, shorting end fitting 20 is formed of a dielectric plastic material and is generally similar to power supply end fitting 16 in that it has a stem 52 extending from one end, and a shroud 54 which surrounds the base of the stem and defines an annular receptacle 56 therearound. A coupling 58 extends from shorting fitting 20 at right angles to stem 52, the coupling and stem both being hollow to define a continuous fluid passageway through the fitting. An electrically conductive shorting ring 60 is retained inside receptacle 56 and completely encircles the inner circumference thereof. Shorting ring 60 may be threaded as shown in FIG. 5, or may have a smooth inner surface.

Before connecting end fittings 16, 20 to tube 12, wires 14a, 14b are trimmed to a length approximately equal to the axial depth of receptacles 44, 56 and folded back to lie along the outer surface of the tube as shown in FIG. 1. End fittings 16, 20 are then urged into engagement with their respective ends of tube 12 such that stems 38, 52 project into the inner bore of the tube and shrouds 42, 54 pass over and surround the exterior surface of the tube. As the ends of the tube slide into the receptacles of power connection end fitting 16 and shorting end fitting 20, the exposed ends of wires 14a, 14b make contact with terminals 18 and shorting ring 60. Accordingly, a complete circuit is formed for the flow of electrical current, the circuit beginning at a first terminal 18, passing along first wire 14a to the other end of tube 12, through shorting ring 60 to second wire 14b, then back along that wire to the second terminal.

To prevent a short circuit, only one of wires 14a, 14b must contact each of terminals 18. This is assured by having wires 14a, 14b protrude from tube 12 at locations diametrically opposite one another on the tube. This opposite placement of the wires, combined with the fact that terminals 18 each wrap around approximately half of the circumference of receptacle 44, also serves to make the angular relationship between tube 12 and power connection end fitting 16 non-critical in terms of the creation of a proper circuit. That is, the first end of tube 12 may be inserted into receptacle 44 without concern for the angular position of the tube relative to end fitting 16, since proper one-to-one contact between wires 14a, 14b and respective terminals 18 is assured.

Once assembled, conduit 10 is installed in its operative location by connecting couplings 40, 58 to their respective mating fluid handling components and attaching electrical connector 32 to terminal tabs 48.

Whereas a preferred embodiment of the invention has been illustrated and described in detail, it will be apparent that various changes may be made in the disclosed embodiment without departing from the scope or spirit of the invention.

What is claimed is:

1. A conduit connectable to an electric circuit for heating by electric current supplied by the circuit, the conduit comprising:

a tube defining an interior fluid passage and having an outer surface, a first end and a second end;

first and second electrical conductors embedded within and extending between the first and second tube ends and exposed on the outer surface of the tube adjacent the first tube end;

a push-on end fitting for attachment to the first tube end and having a hollow stem for urging into the fluid passage of the tube, an electrically non-conductive shroud surrounding the stem and defining an annular receptacle around the stem for urging over the outer surface of the tube, and electrically conductive means disposed inside of the shroud for making electrical contact with exposed portions of the first and second conductors adjacent the first tube end.

2. A conduit according to claim 1 wherein the end fitting is molded in one piece from a plastic material and the conductive means is molded in place within the end fitting.

3. A conduit according to claim 1 wherein the electrically conductive means comprises shorting means for connecting the first and second conductors to one another.

4. A conduit according to claim 1 wherein the electrically conductive means comprises first and second terminals for contacting the first and second conductors respectively.

5. A conduit according to claim 4 wherein the first and second conductors are exposed at substantially diametrically opposite positions on the tube outer surface, and the first and second terminals each wrap around approximately half of the circumference of the receptacle.

6. A conduit according to claim 4 wherein the first and second electrical conductors are further exposed on the outer surface of the tube adjacent the second tube end, and further including:

a second push-on end fitting for attachment to the second tube end and having a hollow stem for urging into the fluid passage of the tube, an electrically non-conductive shroud surrounding the stem and defining an annular receptacle around the stem for urging over the outer surface of the tube, and electrically conductive shorting means disposed inside of the receptacle for connecting the first and second conductors to one another adjacent the second tube end when the shroud is urged over the second tube end.

7. A push-on end fitting for urging into connection with an end of a tube having an outer surface, a fluid passage, and first and second electrical conductors embedded within and extending along the length of the tube and exposed on the outer surface thereof adjacent the tube end, the end fitting comprising:

- a hollow stem for urging into the fluid passage of the tube to provide a continuation of the fluid passage;
- a shroud integral with the stem and defining an annular receptacle around the stem for urging over the outer surface of the tube; and
- electrically conductive means positioned inside of the receptacle for making electrical contact with exposed portions of the first and second conductors adjacent the tube end.

8. A conduit according to claim 7 wherein the electrically conductive means comprises shorting means for connecting the first and second conductors to one another.

9. A conduit according to claim 7 wherein the electrically conductive means is molded in place within the end fitting.

10. An end fitting according to claim 7 wherein the electrically conductive means comprises first and second terminals for contacting the first and second conductors respectively.

11. A conduit according to claim 10 wherein the first and second terminals each wrap around approximately half of the circumference of the receptacle.

12. A conduit for carrying a fluid flow and connectable to an electric circuit, the conduit comprising:

- a tube having an outer surface, an axial fluid passage, a first end and a second end;
- first and second electrically conductive wires embedded in the tube and extending between the first and second tube ends, the wires exposed on the tube outer surface adjacent the second tube end and exposed at diametrically opposite positions on the tube outer surface adjacent the first tube end;
- a first push-on end fitting for urging into attachment with the first tube end and having a hollow stem for insertion into the fluid passage of the tube and a shroud surrounding the stem and defining an annular receptacle around the stem for fitting around the outer surface of the tube;
- first and second terminals having semi-circular wire contacting portions positioned inside of the receptacle, each of the wire contacting portions extending around approximately half of the inner circumference of the receptacle, and the terminals having connection tabs extending through the end fitting for connection to the electric circuit;
- a second push-on end fitting for urging into attachment with the second tube end; and
- shorting means disposed on the second end fitting for electrically connecting the first and second wires to one another adjacent the second tube end.

* * * * *